United States Patent

Donner

Patent Number: 6,087,748
Date of Patent: Jul. 11, 2000

[54] MAGNETIC POLE ROTOR FOR REVOLUTION COUNTING

[76] Inventor: Michael Donner, Stettiner Str. 39a, 58791 Werdohl, Germany

[21] Appl. No.: 09/077,916
[22] PCT Filed: Jan. 15, 1997
[86] PCT No.: PCT/EP97/00152
 § 371 Date: Jun. 2, 1998
 § 102(e) Date: Jun. 2, 1998
[87] PCT Pub. No.: WO97/26543
 PCT Pub. Date: Jul. 24, 1997

[30] Foreign Application Priority Data

Jan. 16, 1996 [DE] Germany .......... 196 01 271

[51] Int. Cl.⁷ .................. H02K 5/00
[52] U.S. Cl. .................. 310/91; 310/156
[58] Field of Search .......... 310/91, 156, 153, 310/93, 262, 271; 324/207.25; 29/598

[56] References Cited

U.S. PATENT DOCUMENTS

| | | | |
|---|---|---|---|
| 4,219,752 | 8/1980 | Katou | 310/156 |
| 4,547,713 | 10/1985 | Langley et al. | 318/254 |
| 4,704,555 | 11/1987 | Stokes | 310/268 |
| 4,914,334 | 4/1990 | Aso | 310/154 |
| 4,930,201 | 6/1990 | Brown | 29/598 |
| 5,045,740 | 9/1991 | Hishinuma | 310/156 |
| 5,073,738 | 12/1991 | Tang | 310/91 |
| 5,202,598 | 4/1993 | Katsumata | 310/90.5 |
| 5,329,196 | 7/1994 | Rode | 310/156 |
| 5,500,994 | 3/1996 | Itaya | 29/598 |
| 5,861,745 | 1/1999 | Herden | 324/207.2 |
| 5,898,990 | 5/1999 | Henry | 29/598 |

FOREIGN PATENT DOCUMENTS

| | | |
|---|---|---|
| 0213732 | 3/1987 | European Pat. Off. . |
| 3636039 | 4/1988 | Germany . |
| 3805702 | 2/1989 | Germany . |

*Primary Examiner*—Nestor Ramirez
*Assistant Examiner*—Joseph Waks
*Attorney, Agent, or Firm*—Edwin D. Schindler

[57] ABSTRACT

A magnetic pole rotor having a plurality of magnetic poles which are arranged on a base ring. The technical problem is to construct the magnetic pole gear such that a non-rotational connection to the shaft remains assured, even at high operating temperatures. A plastics ring (5) surrounding the magnetic poles is pressed onto a cylindrical surface (2) of the base ring (1) and a cage ring (6) covers the plastics ring (5).

8 Claims, 1 Drawing Sheet

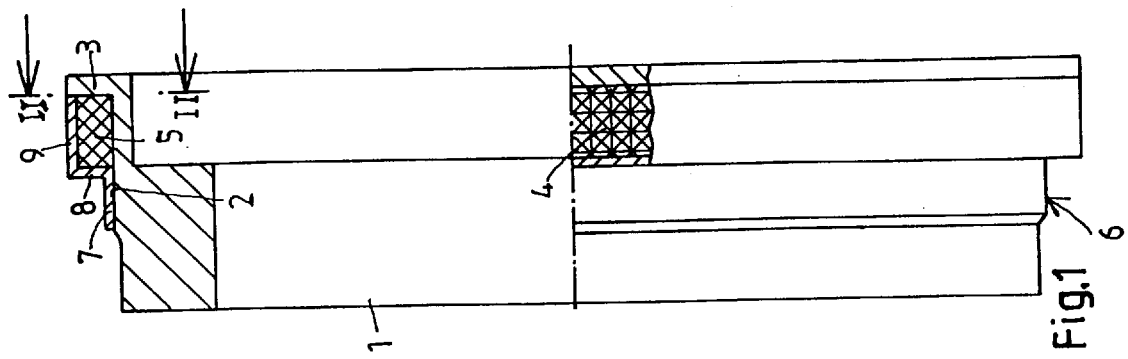
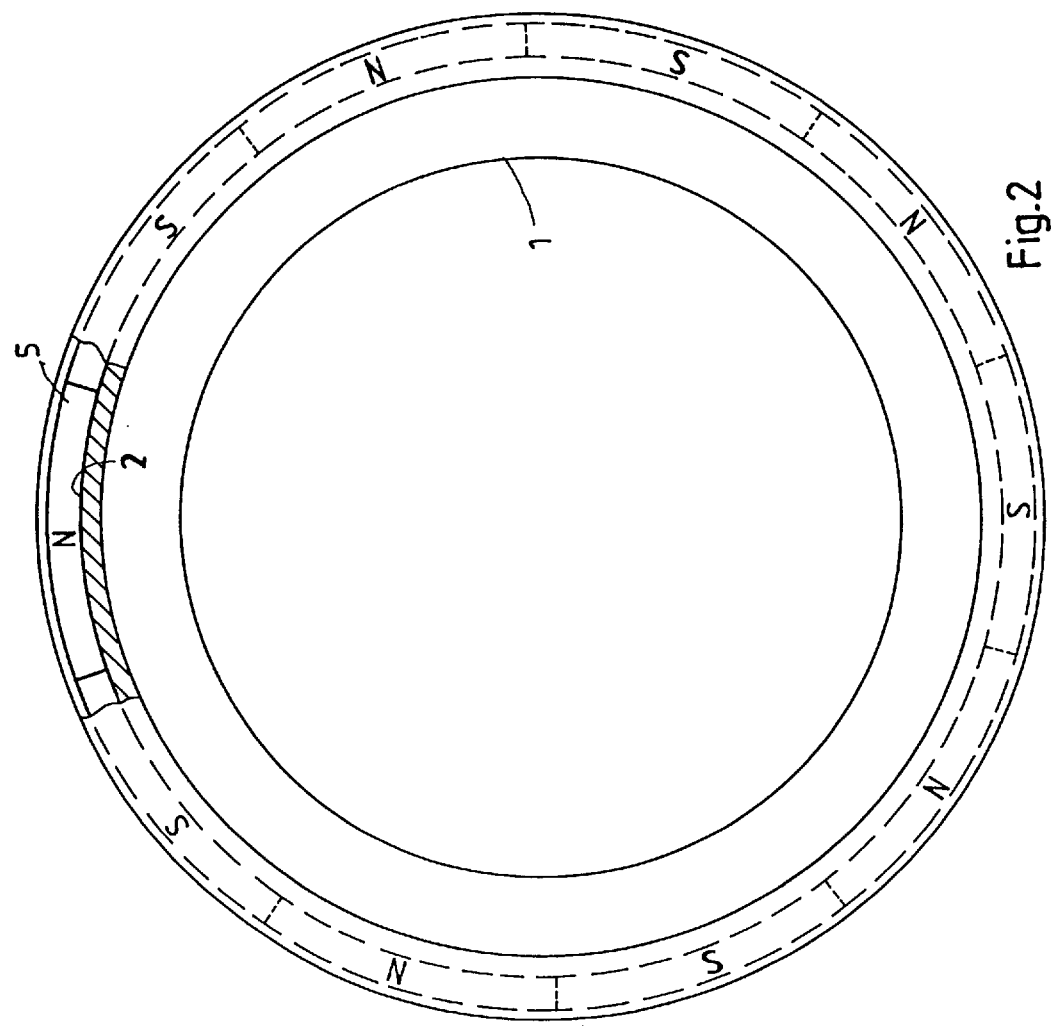

MAGNETIC POLE ROTOR FOR REVOLUTION COUNTING

BACKGROUND OF THE INVENTION

The invention relates to a magnetic pole rotor having a plurality of magnetic poles which are arranged on a base ring.

The field of application of the invention is the measurement of the rotational speed of shafts such as turbine shafts, generator shafts, machine shafts, drive shafts and the like. A particular field of application can be seen in automotive engineering in the case of gear shafts, speedometer shafts, crankshafts, camshafts, gears and the like.

PRIOR ART

The use of gearwheel-type rotors is known. These bring about very steep shift gradients when scanning. Consequently, rotary oscillations of the shaft can generate shift pulses and simulate rotational speed. False pulses of this type lead to the recognition of undefined driving conditions which result in disconnection of the controls, so that the motor vehicle is no longer operative and has to be towed away.

DE 36 36039 A1 discloses magnetic pole gears of a plastics-bonded magnetic material which have a desired number of poles. These magnetic pole gears have a relatively smooth shifting behaviour, so that the said rotary oscillations cannot lead to false measurements. However, since the strength of the plastics material decreases at high operating temperatures of 200° C., at high rotational speeds of several thousand revolutions per minute the magnetic pole gear can be displaced in the peripheral direction with respect to the shaft, with the result that it is no longer possible to measure the rotational speed accurately.

STATEMENT OF INVENTION

The object of the invention is to construct the magnetic pole gear such that a non-rotational connection to the shaft remains assured even at high operating temperatures.

This object is achieved according to the invention in that a plastics ring surrounding the magnetic poles is pressed onto a cylindrical surface of the base ring, and in that a cage ring covers the plastics ring.

The invention differs from the prior art in that the plastics ring is pressed firmly onto the base ring by the cage ring so that, in the event of high temperatures causing the strength of the plastics material to decrease, said plastics ring cannot be displaced in the peripheral direction on the shaft, even at high rotational speeds. This ensures accurate rotational speed measurement.

The press fit is improved in that the cylindrical surface has a knurl-type profile.

Precise alignment of the plastics ring on the base ring is ensured in that the plastics ring abuts against an annular wall of the base ring in the axial direction.

Reliable sheathing of the plastics ring is achieved in that the cage ring has an L-shaped profile and thus covers the outer surface of the plastics ring entirely.

A durable press connection is achieved in that there is seated on the inner edge of the cage ring an annular sheathing which is pressed onto the base ring.

The number of poles of the magnetic pole rotor is selected according to the required accuracy of measurement. To a large extent, there can be any number of poles.

BRIEF DESCRIPTION OF THE DRAWING

An exemplary embodiment of the invention is explained with reference to the drawing, in which:

FIG. 1 shows a partially sectional view of the magnetic pole rotor; and

FIG. 2 shows a view in the axial direction.

EXEMPLARY EMBODIMENT

The magnetic pole rotor includes a base ring 1 of steel, ceramic or composite material, which is tensioned in the axial direction on a shaft whereof the rotational speed is to be measured, and can thus take up the high tensile force. The shaft can be the gear shaft of a motor vehicle. The base ring 1 has an outer cylindrical surface 2 which adjoins an outwardly directed annular wall 3. The cylindrical surface 2 is provided with a knurl-type profile 4.

A plastics ring 5 contains embedded magnetic poles whereof the orientation N, S is specified in FIG. 2. These can be magnetic parts inserted in an annular connection. Frequently, however, plastics rings 5 of this type are injection moulded parts. The magnetic poles are polarized in the desired manner. The plastics ring 5 is pressed onto the cylindrical surface 2, the knurl-type portion 4 ensuring a reliable seating. The strength of the plastics material is adversely affected at high temperatures. At high rotational speeds of several thousand revolutions per minute, the plastics ring 5 must therefore be prevented from being displaced in the peripheral direction on the cylindrical surface 2, thereby resulting in an incorrect rotational speed measurement.

A cage ring 6 secures the plastics ring 5. Starting from the inner edge, the cage ring 6 includes an annular sheathing 7, a radial annular wall 8 and an annular sheathing 9. The annular wall 8 and the annular sheathing 9 form an L-shaped profile. The cage ring 6 is pressed onto the base ring 1 and thus holds the plastics ring 5 firmly so that the latter is always connected non-rotationally to the base ring 1.

What is claimed is:

1. A magnetic pole rotor, comprising:
    a plurality of magnetic poles arranged on a base ring having a cylindrical surface with a knurl-type profile;
    a plastic ring surrounding the magnetic poles being pressed onto the cylindrical surface of said base ring; and,
    a cage ring covering said plastic ring, wherein an annular sheathing is seated on an inner edge of said cage ring, said annular sheathing being pressed onto said base ring.

2. The magnetic rotor according to claim 1, wherein said plastic ring abuts against an annular wall of said base ring in an axial direction.

3. The magnetic rotor according to claim 1, wherein said cage ring has an L-shaped profile which entirely covers an outer surface of said plastic ring.

4. A magnetic pole rotor, comprising:
    a plurality of magnetic poles arranged on a base ring having a cylindrical surface;

a plastic ring surrounding the magnetic poles being pressed onto the cylindrical surface of said base ring; and, a cage ring having an L-shaped profile for entirely covering an outer surface of said plastic ring, with an annular sheathing, which is pressed onto said base ring, and being seated onto an inner edge of said cage ring.

5. The magnetic pole rotor according to claim 4, wherein the cylindrical surface of said base ring has a knurl-type profile.

6. The magnetic rotor according to claim 4, wherein said plastic ring abuts against an annular wall of said base ring in an axial direction.

7. A magnetic pole rotor, comprising:

a plurality of magnetic poles arranged on a base ring having a cylindrical surface;

a plastic ring surrounding the magnetic poles being pressed onto the cylindrical surface of said base ring; and, a cage ring, covering said plastic ring, having an annular sheathing, which is pressed onto said base ring, and being seated onto an inner edge of said cage ring.

8. The magnetic rotor according to claim 7, wherein said plastic ring abuts against an annular wall of said base ring in an axial direction.

* * * * *